(12) United States Patent
Miller et al.

(10) Patent No.: US 10,438,485 B2
(45) Date of Patent: Oct. 8, 2019

(54) APPARATUS AND METHOD FOR TRANSMITTING STATIC AND DYNAMIC INFORMATION TO A PERSONAL COMMUNICATION DEVICE IN A VEHICLE

(71) Applicant: Ford Global Technologies, LLC, Dearborn, MI (US)

(72) Inventors: Thomas Lee Miller, Ann Arbor, MI (US); Doron M. Elliott, Detroit, MI (US); Robert Bruce Kleve, Farmington, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 86 days.

(21) Appl. No.: 15/064,479

(22) Filed: Mar. 8, 2016

(65) Prior Publication Data

US 2016/0293007 A1    Oct. 6, 2016

Related U.S. Application Data

(63) Continuation of application No. 13/566,309, filed on Aug. 3, 2012, now abandoned.

(51) Int. Cl.
*G08G 1/0967* (2006.01)
*B60K 35/00* (2006.01)
(Continued)

(52) U.S. Cl.
CPC ....... *G08G 1/096791* (2013.01); *B60K 35/00* (2013.01); *B60K 2370/195* (2019.05);
(Continued)

(58) Field of Classification Search
CPC ....... B60G 21/0551; B60G 2204/1224; B60W 2050/046; G08G 1/096791;
(Continued)

(56) References Cited

U.S. PATENT DOCUMENTS 6,353,778 B1    3/2002   Brown
6,411,899 B2    6/2002   Dussell et al.
(Continued)

FOREIGN PATENT DOCUMENTS

CN    101341517 A    1/2009
CN    102112961 A    6/2011
(Continued)

OTHER PUBLICATIONS

English translation of DE 199 61 619 A1, Jun. 28, 2001, 5 pages.
(Continued)

*Primary Examiner* — Mirza F Alam
(74) *Attorney, Agent, or Firm* — Michael Spenner; Brooks Kushman P.C.

(57) ABSTRACT

In at least one embodiment, an apparatus for transmitting vehicle information to a portable personal communication device (PCD) is provided. The apparatus comprises a communication module positioned in the first vehicle. The communication module is configured to transmit a first signal including static information and dynamic information to the first PCD. The static information includes one of a first vehicle serial number and a vehicle type and the dynamic information includes one of a connect status, a driver alert rating, and a silent alarm. The first PCD is arranged to control operation thereof based on at least one of the static information and the dynamic information.

20 Claims, 5 Drawing Sheets

(51) Int. Cl.
*G08B 21/06* (2006.01)
*G08B 25/10* (2006.01)
*B60W 50/04* (2006.01)

(52) U.S. Cl.
CPC .... *B60K 2370/52* (2019.05); *B60W 2050/046* (2013.01); *G08B 21/06* (2013.01); *G08B 25/10* (2013.01)

(58) Field of Classification Search
CPC ........ B60K 2350/352; B60K 2350/906; G01C 21/3661; G09G 2340/14; H04W 48/04; H04W 4/046; B60R 25/2018
See application file for complete search history.

(56) References Cited

U.S. PATENT DOCUMENTS

| | | | |
|---|---|---|---|
| 6,690,956 B2 | 2/2004 | Chua et al. | |
| 7,075,409 B2 | 7/2006 | Guba | |
| 7,471,929 B2 | 12/2008 | Fujioka et al. | |
| 7,505,784 B2 | 3/2009 | Barbera | |
| 7,812,712 B2 * | 10/2010 | White | A61B 5/117 340/426.2 |
| 7,957,773 B2 | 6/2011 | Chua et al. | |
| 8,050,815 B2 | 11/2011 | Perry et al. | |
| 8,131,205 B2 | 3/2012 | Rosen | |
| 8,159,324 B2 | 4/2012 | Zellweger et al. | |
| 8,718,866 B2 | 5/2014 | Miller et al. | |
| 8,736,434 B2 | 5/2014 | Miller et al. | |
| 2002/0107032 A1 | 8/2002 | Agness et al. | |
| 2003/0134660 A1 | 7/2003 | Himmel et al. | |
| 2004/0059471 A1 * | 3/2004 | Harvey | B60R 25/04 701/1 |
| 2004/0198306 A1 | 10/2004 | Singh et al. | |
| 2007/0072616 A1 | 3/2007 | Irani | |
| 2007/0120948 A1 | 5/2007 | Fujioka et al. | |
| 2007/0124043 A1 | 5/2007 | Ayoub et al. | |
| 2008/0309451 A1 | 12/2008 | Zellweger et al. | |
| 2009/0111422 A1 | 4/2009 | Bremer et al. | |
| 2009/0312901 A1 | 12/2009 | Miller et al. | |
| 2010/0035632 A1 | 2/2010 | Catten | |
| 2010/0202346 A1 * | 8/2010 | Sitzes | H04W 84/18 370/328 |
| 2010/0227629 A1 | 9/2010 | Cook et al. | |
| 2011/0021234 A1 * | 1/2011 | Tibbitts | H04W 48/04 455/517 |
| 2011/0039581 A1 | 2/2011 | Cai et al. | |
| 2011/0063099 A1 | 3/2011 | Miller et al. | |
| 2011/0077032 A1 * | 3/2011 | Correale | H04M 1/72569 455/466 |
| 2011/0105082 A1 | 5/2011 | Haley | |
| 2011/0105097 A1 | 5/2011 | Tadayon et al. | |
| 2011/0136509 A1 | 6/2011 | Osann, Jr. | |
| 2011/0257973 A1 * | 10/2011 | Chutorash | G01C 21/3661 704/235 |
| 2011/0298924 A1 | 12/2011 | Miller et al. | |
| 2011/0300843 A1 | 12/2011 | Miller et al. | |
| 2011/0301780 A1 | 12/2011 | Miller et al. | |
| 2012/0119936 A1 | 5/2012 | Miller et al. | |
| 2012/0122525 A1 | 5/2012 | Miller et al. | |
| 2012/0220213 A1 | 8/2012 | Fischer et al. | |
| 2012/0221169 A1 | 8/2012 | Miller et al. | |
| 2012/0289215 A1 | 11/2012 | Elliott et al. | |
| 2013/0300552 A1 * | 11/2013 | Chang | B60Q 9/00 340/436 |
| 2014/0095014 A1 * | 4/2014 | Rude | G07C 5/008 701/31.4 |
| 2014/0200765 A1 * | 7/2014 | Waeller | H04L 12/282 701/36 |

FOREIGN PATENT DOCUMENTS

| | | |
|---|---|---|
| CN | 102239062 A | 11/2011 |
| DE | 19961619 A1 | 6/2001 |
| WO | 2011016886 A1 | 2/2011 |

OTHER PUBLICATIONS

Sync Powered by Microsoft, Supplemental Guide, Aug. 2009, 87 pages.
Ford Motor Company, "SYNC with Navigation System", Owner's Guide Supplement, SYNC System Version 1, Jul. 2007, 164 pages.
Ford Motor Company, "SYNC", Owner's Guide Supplement, SYNC System Version 1, Nov. 2007, 86 pages.
Ford Motor Company, "SYNC with Navigation System", Owner's Guide Supplement, SYNC System Version 2, Oct. 2008, 194 pages.
Ford Motor Company, "SYNC", Owner's Guide Supplement, SYNC System Version 2, Oct. 2008, 83 pages.
Ford Motor Company, "SYNC with Navigation System", Owner's Guide Supplement, SYNC System Version 3, Jul. 2009, 196 pages.
Chinese Office Action and English translation for Application No. 201310325914, dated Mar. 1, 2017, 14 pages.

* cited by examiner

| Signal Name | Description | Type | Character Size | SED | Definition | Units | Resolution | Min | Max |
|---|---|---|---|---|---|---|---|---|---|
| Serial Number | This represents the serial number of the vehicle which is the last 6 digits of the VIN. This Allows the Phone to learn specific vehicles over time and filter out other vehicle ID's. | Fixed | 6 | N/A | N/A | N/A | N/A | N/A | N/A |
| Manufacturer Code | Identifies the manufacturer of the device. | | | | | | | | |
| PRNDL | This determines if the vehicle is in Park or not. If the vehicle is in Park, the phone can opt to remove and restrictions. If the vehicle is not in Park, the phone can infer that the vehicle is driving and enforce any relevant restrictions. | Event Periodic | 1 | F T | Vehicle is not in Park Vehicle is in Park | N/A N/A | N/A N/A | N/A N/A | N/A N/A |
| Connect Status | This indicates if a phone is actively connected to the vehicles infotainment system for Bluetooth command and control. If a phone is connected, then other phones in the vehicle can infer that they are being operated by a passenger and enforce relevant restrictions (if any). Otherwise, if no phones are connected to the vehicle, then all phones may assume they are being operated by the driver and enforce full restrictions. | Event Periodic | 1 | F T | No phone is connected A phone is connected | N/A N/A | N/A N/A | N/A N/A | N/A N/A |
| DRIVER STATUS | This indicates if the vehicle is being operated by a restricted driver (i.e. teenager). If so, all phones may want to enforce some level of restrictions. | Event Periodic | 1 | F T | Restriction not Active Restriction is Active | N/A N/A | N/A N/A | N/A N/A | N/A N/A |
| Driver Alert Rating | This indicates the Driver Alert Rating determined by the Driver Alert System (DAS). The DAS monitors the drivers driving performance and assigns a rating to the inferred alertness of the driver. The alert rating is measured on a scale form 1 to 5 with 5 being representing a driving performance indicative of a very alert driver and 1 representing a driving performance of a very inattentive driver. | Event Periodic | 1 | 1 2 3 4 5 | Lowest alert Rating Low-Med Alert rating Medium alert rating Med-Hi alert rating Highest alert rating | N/A N/A N/A N/A N/A | N/A | 1 | 5 |
| Silent Alarm | This indicates if the silent alarm has been triggered by the driver. | Event Periodic | 1 | F T | Silent alarm not active Silent alarm is active | N/A N/A | N/A | N/A | N/A |
| Vehicle Speed | This indicates if the vehicle is in motion (greater than 5 mph). The phone may want to limit restrictions only when the vehicle is in motion. This may also be used to associate the phone to a particular serial number when compared to the phones GPS detected speed. | Periodic | 1 | F T | Vehicle is stationary Vehicle is in motion | N/A N/A | N/A | N/A | N/A |
| Vehicle Speed (alt) | This is identical to the speed signal shown above, but provides the actual vehicle speed for greater resolution in associating the phone to a particular vehicle serial number. | Periodic | 3 | N/A | N/A | kph | 1 | 0 | 999 |
| GPS Latitude | This is the GPS Latitude coordinate of the vehicle. The phone may choose to shut down the on-board GPS measurement and use this measurement in an effort to preserve battery life. Note, the vehicle operator will have to disable this feature for privacy. | Periodic | 22-23 | N/A | N/A | deg | | | |
| GPS Longitude | This is the GPS Longitude coordinate of the vehicle. The phone may choose to shut down the on-board GPS measurement and use this measurement in an effort to preserve battery life. Note, the vehicle operator will have to disable this feature for privacy. | Periodic | 22-23 | N/A | N/A | deg | | | |
| Camera Status | This has been included in anticipation of the vehicle utilizing an integrated interior camera to detect phone usage in the drivers seat. It works by monitoring the driver position for phone usage and in the event phone usage is detected, the device name will transmit "Camera Detection" = true. The phone can correlate a change in its own status to a change in "Camera Detection" status and infer that it is being used by a driver. | Periodic | 1 | F T | No phone detected in driver position Phone usage is detected in driver Position | | N/A | N/A | N/A |

*Fig-3*

APPARATUS AND METHOD FOR TRANSMITTING STATIC AND DYNAMIC INFORMATION TO A PERSONAL COMMUNICATION DEVICE IN A VEHICLE

CROSS-REFERENCE TO RELATED APPLICATIONS

This application is a continuation of U.S. application Ser. No. 13/566,309 filed Aug. 3, 2012, now abandoned, the disclosure of which is hereby incorporated in its entirety by reference herein.

TECHNICAL FIELD

Embodiments set forth herein generally related to an apparatus and method for transmitting static and dynamic information to a personal communication device (PCD).

BACKGROUND

It is known to transmit information from a vehicle to a cell phone. One example of such an implementation is set forth in International Publication Number WO 2011/016886 ("the '886 publication") to Miller et al.

The '886 publication provides an apparatus for transmitting vehicle information to an occupant communication device (OCD). The apparatus comprises a communication module that is positioned within the vehicle. The communication device is configured to receive a transmission status signal indicative of a transmission mode for the vehicle. The communication device is further configured to transmit the transmission status signal over a wireless protocol to the OCD such that the OCD is disabled from being controlled by switches positioned thereon if the transmission mode enables movement of the vehicle.

SUMMARY

In at least one embodiment, an apparatus for transmitting vehicle information to a portable personal communication device (PCD) is provided. The apparatus comprises a communication module positioned in the first vehicle. The communication module is configured to transmit a first signal including static information and dynamic information to the first PCD. The static information includes one of a first vehicle serial number and a vehicle type and the dynamic information includes one of a connect status, a driver alert rating, and a silent alarm. The first PCD is arranged to control operation thereof based on at least one of the static information and the dynamic information.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompany drawings in which:

FIG. 3 depicts a table including information related to static information and dynamic information of the device name signal as shown in FIG. 2;

DETAILED DESCRIPTION

Figure 1:
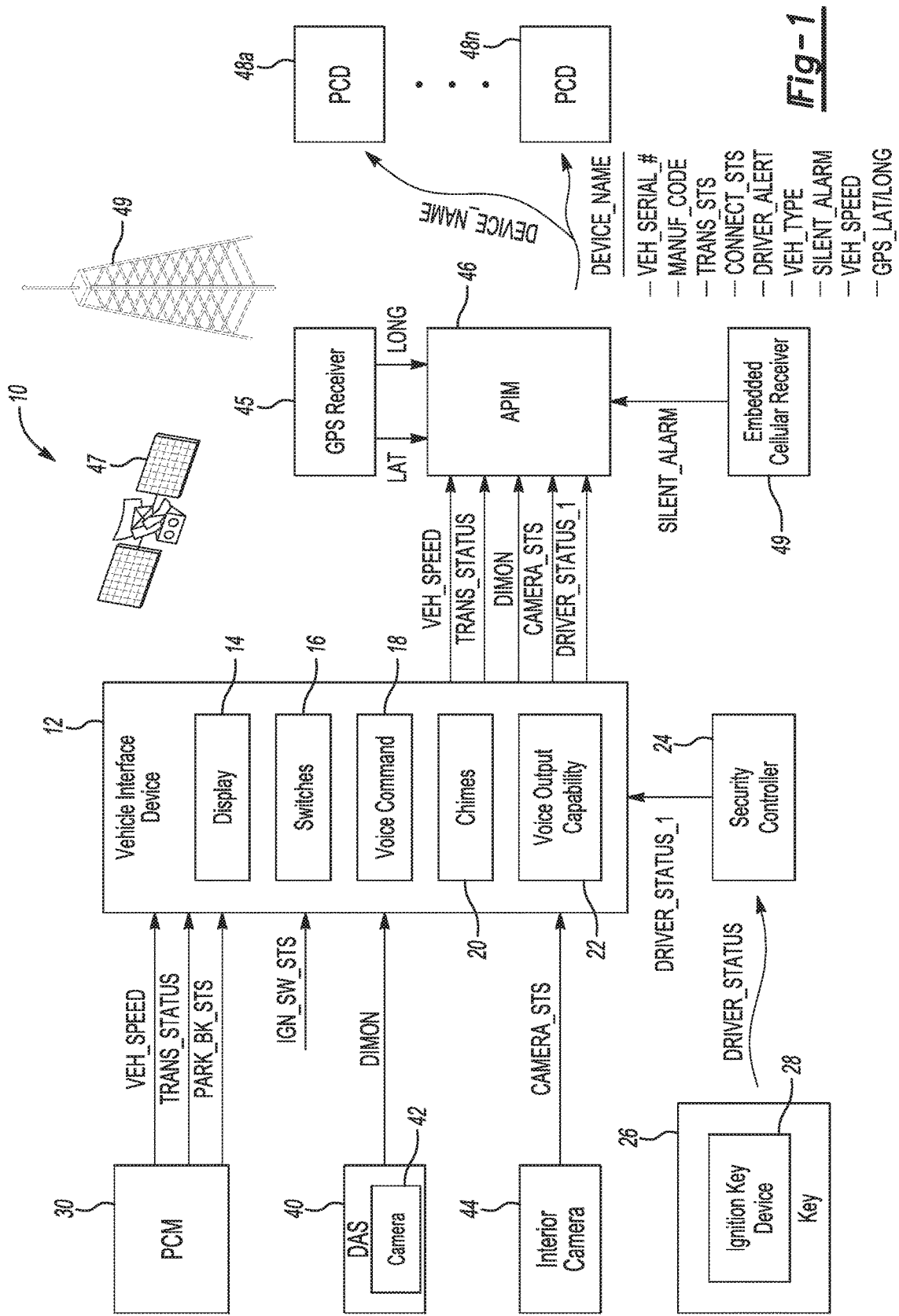
FIG. 1 depicts a system for transmitting static and dynamic information from a vehicle in accordance to one embodiment of the present invention.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Distracted driving caused by manual interaction with cell phone may be a growing social issue. Some third party applications have been developed to mitigate this issue. Such applications may include a trigger to determine if a user of the cell phone is operating a vehicle, and if so, restrict various functions of the cell phone. For example, the application may restrict manual operation of the cell phone and may also filter incoming calls and text messages.

One example of a trigger is the cell phones ability to measure global positioning system (GPS) speed. The cell phone may include an integrated GSP chip to determine if the cell phone is moving at speeds indicating vehicle use (e.g., typically greater than 10 mph). One aspect of using GPS speed is that the cell phone may not determine if the user of the cell phone is a driver or a passenger. Further, the cell phone may not know whether it is in a vehicle, train, bus, etc. In this case, it is not desirable to impose cell phone restrictions. Some applications may address this by allowing the user to temporarily override the restrictions. Such an implementation may however defeat the purpose of the application to begin with. Another aspect of using GPS speed as a trigger is that the user may simply disable the GPS measurement on the cell phone to not only disable the restrictions but to also preserve battery life.

Some applications may use an aftermarket Bluetooth® based device that is connected to a diagnostic port of a vehicle. Such a connection may provide vehicle speed from the vehicle and transmit to the cell phone. In this arrangement, the user may simply disconnect the device from the diagnostic port to avoid cell phone restrictions. Similarly, the user may disable the Bluetooth connection on the cell phone. Some applications address these defeat methods by triggering alarms to an administrative driver (i.e., a driver who monitors activities for secondary drivers such as a teenager, employee, technician, etc.).

Some applications may use the vehicle's onboard hands free infotainment system as a trigger. While such an implementation may be useful, this implementation may not restrict usage of another cell phone that may be available to the driver. For example, a passenger may simply pass his/her cell phone to the driver in an effort to bypass this implementation. Additionally, the driver may intentionally or unintentionally disconnect the cell phone from the vehicle's infotainment system.

To improve fidelity of these distracted driving applications, all cell phones (or personal communication devices (PCDs)) within a vehicle may be provided with static and dynamic information from the vehicle. This may enable all PCDs in the vehicle to determine that they are in a vehicle and may also provide the PCD with vehicle information to enable functionality in addition to PCD restrictions.

The embodiments of the present disclosure generally provide for a plurality of circuits or other electrical devices. All references to the circuits and other electrical devices and the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microprocessors, integrated circuits, memory devices (e.g., FLASH, RAM, ROM, EPROM, EEPROM, or other suitable variants thereof) and software which co-act with one another to perform operation(s) disclosed herein.

Embodiments set forth herein generally provide an apparatus and method for transmitting static and dynamic information to the PCD. The PCD may be a cell phone or other device that enables an occupant to communicate with another person via wireless signals that are transmitted therebetween. The disclosure as set forth herein depicts that information, such as but not limited to, vehicle speed, transmission status, connect status, driver alert rating, vehicle type, silent alarm, etc. may be wirelessly transmitted to the PCD. Such information may be transmitted via a device name signal that is associated with a Bluetooth protocol. Once communication is established with the vehicle, the PCD may utilize the information from the vehicle to perform any number of functions.

FIG. 1 depicts a system 10 for transmitting static and dynamic information from a vehicle in accordance to one embodiment. The system 10 generally comprises a vehicle interface device ("device") 12. The device 12 includes a display 14 that provides information related to the various states of vehicle functionality or visual warnings to the driver. For example, the display 14 may provide, but not limited to, a driver identification message during vehicle startup, various administrative menu options, a seatbelt warning message, a speed limit start up message, vehicle near top speed message, top speed message, driver identification speed warnings, one or more levels of visual warnings for tailgating and/or an inhibit electronic stability control ("ESC") and forward collision warning (FCW) message, an alert to notify the driver that the vehicle is too close to another vehicle or object, etc.

The device 12 also includes a plurality of switches 16, a voice recognition command interface 18, chimes 20, and voice output capability 22. The driver may toggle the switches 16 to view different messages and/or select various options. The voice recognition command interface 18 may enable the vehicle to receive commands from the driver so that the driver may audibly input commands and/or responses. One example of a voice recognition command interface is disclosed in U.S. Patent Publication No. 20040143440 ("the '440 publication"), entitled "Vehicle Speech Recognition System," filed Dec. 31, 2003.

The chimes 20 may audibly notify the driver when predetermined vehicle conditions have been met. In one example, the device 12 may activate the chimes 28 when the vehicle is near a top speed, the vehicle has achieved a top speed, the vehicle has exceeded the top speed, there is a low level of fuel in the fuel tank, when the vehicle is detected to be too close to another vehicle or obstacle to prevent a collision, when the traction control is enabled, etc. In one example, the voice output capability 22 enables the device 12 to transmit audio signals to the driver in the manner, but not limited to, that described in the '440 publication. In one example, the switches 16 may be positioned within the display 14 such that the display 14 and the switches 16 function as a touch screen. The switches 16 may be implemented as alpha-numeric characters. While the display 14, the switches 16, the voice input command interface 18, chimes 20, and the voice output capability 22 are shown within the controller 12, it is contemplated that one or more of these mechanisms may be positioned exterior to the controller 12.

A security controller 24 is operably coupled to the device 12. While FIG. 1 generally illustrates that the security controller 24 is positioned outside of the device 12, other implementations may include the security controller 24 being implemented directly within the device 12. In general, one or more of the signals transmitted to/from the device 12 may be transmitted via a data communication bus. The bus may be implemented as a High/Medium Speed Controller Area Network (CAN) bus, a Local Interconnect Network (LIN) bus or other suitable bus generally situated to facilitate data transfer therethrough. The particular type of bus used may be varied to meet the desired criteria of a particular implementation.

An ignition switch (not shown) may receive one or more keys 26. The device 12 may receive a signal IGN_SW_STS from a body controller (not shown) to determine the position of the ignition switch. The keys 26 may be tagged or associated with a primary driver or a secondary driver of the vehicle. The primary driver (or administrative driver) may be a parent, employer, or other suitable person who exercises complete control over the vehicle. The secondary driver may be a teenager, a valet, an employee, a technician or other person who must abide by vehicle parameters established by the primary driver. The key 26 includes an ignition key device 28 embedded therein for wirelessly communicating with the vehicle. The ignition key device 28 comprises a transponder (not shown) having an integrated circuit and an antenna. The transponder is adapted to transmit an electronic code as a signal DRIVER_STATUS to a receiver (not shown) in the security controller 24. Data on the signal DRIVER_STATUS may be indicative of which driver (e.g., primary or secondary) is driving the vehicle. The signal DRIVER_STATUS may be in the form of radio frequency (RF) based signal or radio frequency identification (RFID) tag that corresponds to binary data. The security controller 24 determines if additional data in the signal DRIVER¬_STATUS matches predetermined data stored therein (e.g., in a look up table of the security controller 24) prior to allowing the vehicle to start for anti-theft purposes. A powertrain control module (or engine controller) 30 allows the vehicle to start the engine in the event the data on the signal DRIVER_STATUS matches the predetermined data.

The security controller 24 may transmit a signal DRIVER_STATUS_1 to indicate whether the particular driver is the primary driver or the secondary driver to various vehicle controllers or modules as either digital data on the data communication bus or hardwired signals. Prior to the security controller 24 transmitting the signal DRIVER_STATUS_1, the primary and secondary keys are learned to the security controller 24. The learning and programming of the keys 26 as either a primary or a secondary key is set forth in U.S. Pat. No. 7,868,750 ("the '750 patent") to Miller et al., which is hereby incorporated by reference in its entirety. It is recognized that the security controller 24 may be a passive anti-theft controller as set forth in the '750 patent. It is also recognized that security controller 24 as set forth in FIG. 1 of the present disclosure may be implemented as a passive-entry-passive start (PEPS) controller as set forth in the '750 patent.

The engine controller 30 is operably coupled to the device 12. The device 12 transmits an authorization signal (not shown) to the engine controller 30 in response to determining that the key 26 is authorized to start the vehicle. The engine controller 30 is configured to provide a signal VEH_SPEED over the data communication bus to the device 12. The signal VEH_SPEED corresponds to the speed of the vehicle. The engine controller 30 is also configured to provide a signal TRANS_STATUS over the data communication bus to the device 12. The signal TRANS_STATUS corresponds to the transmission status of the vehicle (e.g., whether the vehicle is in Park, Neutral, Drive, Low (PRNDL)). Alternatively, the engine controller 30 is configured to transmit a signal PARK_BK_STS over the data communication bus to the device 12. The signal PARK_BK_STS corresponds to the park brake status of the vehicle (e.g., whether the park brake switch is engaged). The signal PARK_BK_STS may be of interest in the event the vehicle is equipped with a manual transmission. For example, if the signal PARK_BK_STS indicates that the park brake is engaged, this condition may correspond to the vehicle being in a parked state while the vehicle is equipped with the manual transmission. It may not be possible for a manual transmission based vehicle to provide transmission status. If the signal PARK_BK_STS indicates that the park brake is not engaged, such a condition may indicate that the vehicle is moving.

A driver alert system (DAS) module 40 is operably coupled to the device 12. The DAS module 40 uses a forward pointing camera 42 to determine what side of the vehicle is deviating from a lane or crossing over the lane to issue a warning. The DAS module 40 is configured to detect a shift in the driver's performance that may cause the vehicle to leave a lane or head off of the road. For example, the LDW module 40 measures a Driver's Impairment Monitor (DIMON) (or driver alert rating (DAR)) and assigns a rating to it. The DIMON tracks vehicle variation within the lane. In general, the DAS module 40 monitors the DIMON to detect a shift in the driver's performance that may be attributed to the driver exhibiting a drowsy or sleepy condition. In the event the DIMON rating is low (or below a pre-defined threshold), the DAS module 40 may transmit a signal DIMON to the device 12 for visually and/or audibly notifying the driver that the driver's performance indicates that the driver is in a "drowsy state." The alert is provided to the driver so that the driver can pull himself/herself out of the drowsy state.

An interior camera 44 is also provided to capture an image of a driver to monitor phone usage for the driver while positioned in the vehicle. One example of this implementation is set forth in U.S. Patent Publication No. 20110298924 to Miller et al. The interior camera 44 also includes hardware and/or software for generating a signal CAMERA_STS to provide status as to whether the driver is detected to be utilizing a PCD 48 or not. The interior camera 44 may provide the signal CAMERA_STS to indicate that there is PCD usage in the driver seat. For example, the interior camera 44 may capture an image of the driver while in a driver zone and process data to detect any gesture or motion that indicates PCD usage (e.g., manual entry on the PCD 18, the viewing of a screen/display, or holding of the PCD 48 to an ear of the driver). Once the interior camera 44 detects any gesture or motion that indicates PCD usage, the camera 44 transmits the signal CAMERA_STS to indicate that the driver is engaged in PCD usage.

A global positioning satellite (GPS) system 45 that includes a receiver (not shown) and an auxiliary protocol interface module (or communication module) 46 are operably coupled to one another via the data communication bus. The GPS system 45 is configured to provide the location of the vehicle. The GPS system 45 transmits a signal LAT indicative of the latitude of the vehicle and a signal LONG indicative of the longitude of the vehicle. In general, a plurality of satellites 47 and/or a plurality of ground stations 49 communicate with the GPS system 45 to establish the location of the vehicle. For example, the GPS system 45 is capable of establishing the vehicle's position and velocity relative to the earth's surface processing data received from the plurality of satellites 47 and/or the ground stations 49.

As the vehicle moves latitudinally and/or longitudinally across the earth's surface, the GPS system 45 is capable of providing the position of the vehicle with reference coordinates that correspond to, among other things, the latitude and longitude on the earth's surface. It is generally known that the implementation of a GPS system 45 on a vehicle is capable of providing the position of the vehicle via latitude and longitude coordinates relative to the earth's surface.

The APIM 46 may be operably coupled to the device 12 via the communication bus. The device 12 may transmit the signals VEH_SPEED, TRANS_STATUS, DIMON, CAMERA_STS, and DRIVER_STATUS_1 to the APIM 46. The GPS system 45 may transmit the signals LAT and LONG to the APIM 46. It is recognized that the signals noted above may be transmitted directly to the APIM 46 from the security controller 24, the engine controller 30, the DAS module 40, the interior camera 44, and/or the GPS system 45.

The APIM 46 may be wirelessly coupled to any number of portable communication devices (PCDs) 48a-48n ("48") via a Bluetooth protocol. Each PCD 48 may be a cell phone or other suitable alternative. The APIM 46 is part of an in-vehicle communication system (and includes at least one transmitter (not shown) and at least one receiver (not shown)) which interfaces with each PCD 48 to enable normal operation thereof, voice input control to perform a function with the PCD 48 so that the driver does not have to enter data directly into the PCD 48. The APIM 46 may allow the user to operate a PCD 48 either in a handheld mode (e.g., manual mode) or in a voice control mode (e.g., w/o touch input control). The APIM 46 may interface via switches (not shown) positioned within the vehicle to enable touch selection control to perform a function with the PCD 48 so that the driver does not have to enter data directly into the PCD 48. In one example, the APIM 46 may be implemented as part of the SYNC® system developed by Ford Motor Company® and Microsoft®. Switches may be positioned on the APIM 46, the vehicle's steering wheel (not shown) or on the device 12 to enable touch input.

The APIM 46 may transmit a signal DEVICE_NAME to each PCD 48 within range. In general, a transmitting device that transmits information over a Bluetooth protocol is known to provide a device name to a receiving device. The device name generally provides an indication as to the identity of the transmitting device. For example, the APIM 46 may be known as a SYNC device. In this case, the APIM 46 may transmit a device name corresponding to SYNC. The APIM 46 is now configured to not only provide its identity, but may also provide a number of vehicle related data or other data that may enable the PCD 48 to perform various operations. Such operations may include PCD usage restrictions or enabling a PCD provider network to provide various alerts.

The APIM 46 may be paired to a particular PCD 48 while at the same time provide the signal DEVICE_NAME to additional PCDs 48 that are detected in the vehicle. For example, the APIM 46 may transmit the signal DEVICE_NAME as a beacon signal to all of the PCDs 48 that are within range of the transmitter. If there are multiple PCDs 48 in the vehicle, each PCD 48 is configured to receive the signal DEVICE_NAME from the APIM 46. It is recognized that one of these PCDs 48 may belong to the driver of the vehicle and such a PCD 48 is paired to the APIM 46 so that hands free PCD operation is performed. While the PCD 48 is paired to the APIM 46, the paired PCD 48 and the APIM 46 may undergo bi-directional communication with one another to provide the hands free operation (or other features provided by SYNC®). For example, when a particular PCD 48 is paired with the APIM 46, such a pairing requires some level of user interaction to create a bond between the two devices. In particular, the user may explicitly request to "Add a Bluetooth device" to the APIM 46. While paired, the APIM 46 may control various aspects of the paired PCD 48 to enforce hands free operation, etc.

The remaining PCD(s) 48 on the other hand (i.e., that belong to passenger(s)) in the vehicle may generally engage in single-directional communication with the APIM 46 to receive vehicle related information so that such PCDs 48 may perform desired operations based on information included in the signal DEVICE_NAME. These PCD(s) 48 may not be under the control of the APIM 46 but may instead, simply receive the signal DEVICE_NAME for the purpose of receiving vehicle related data or other data.

An embedded cellular module 49 is positioned in the vehicle and is configured to transmit a signal SILENT_ALARM to the APIM 46. In general, a silent alarm may be triggered by an occupant in the vehicle in the event the occupant experiences distress such as for example a carjacking, or an immediate health concern. A switch (not shown) may be discretely positioned in the vehicle and may be triggered by the occupant due to such distress. The embedded cellular module 49 transmits the signal SILENT_ALARM to the APIM 46 over the data communication bus. The APIM 46 may then indicate that the silent alarm is active on the signal DEVICE_NAME which is then transmitted to the PCDs 48a-48n within range of the transmitter of the APIM 46. The PCD 48, if positioned in the vehicle, may then upload the silent alarm notification in the service provider network of the respective PCD 48 to provide notice that there is a distress situation at play. Likewise, a PCD 48 traveling in a vehicle that is within range of the vehicle encountering the distressed state may also detect the presence of the silent alarm and may then upload the silent alarm notification in the service provider network to which it belongs to and notify authorities. The identity and location of the PCD 48 that transmits the silent alarm, once uploaded into the service provider network can be ascertained via phone tower triangulation or by the GPS coordinates provided by the same on the signal DEVICE_NAME.

The information included in the signal DEVICE_NAME and the operations executed by the PCD(s) 48 based on such information will be described in more detail below.

Figure 2:
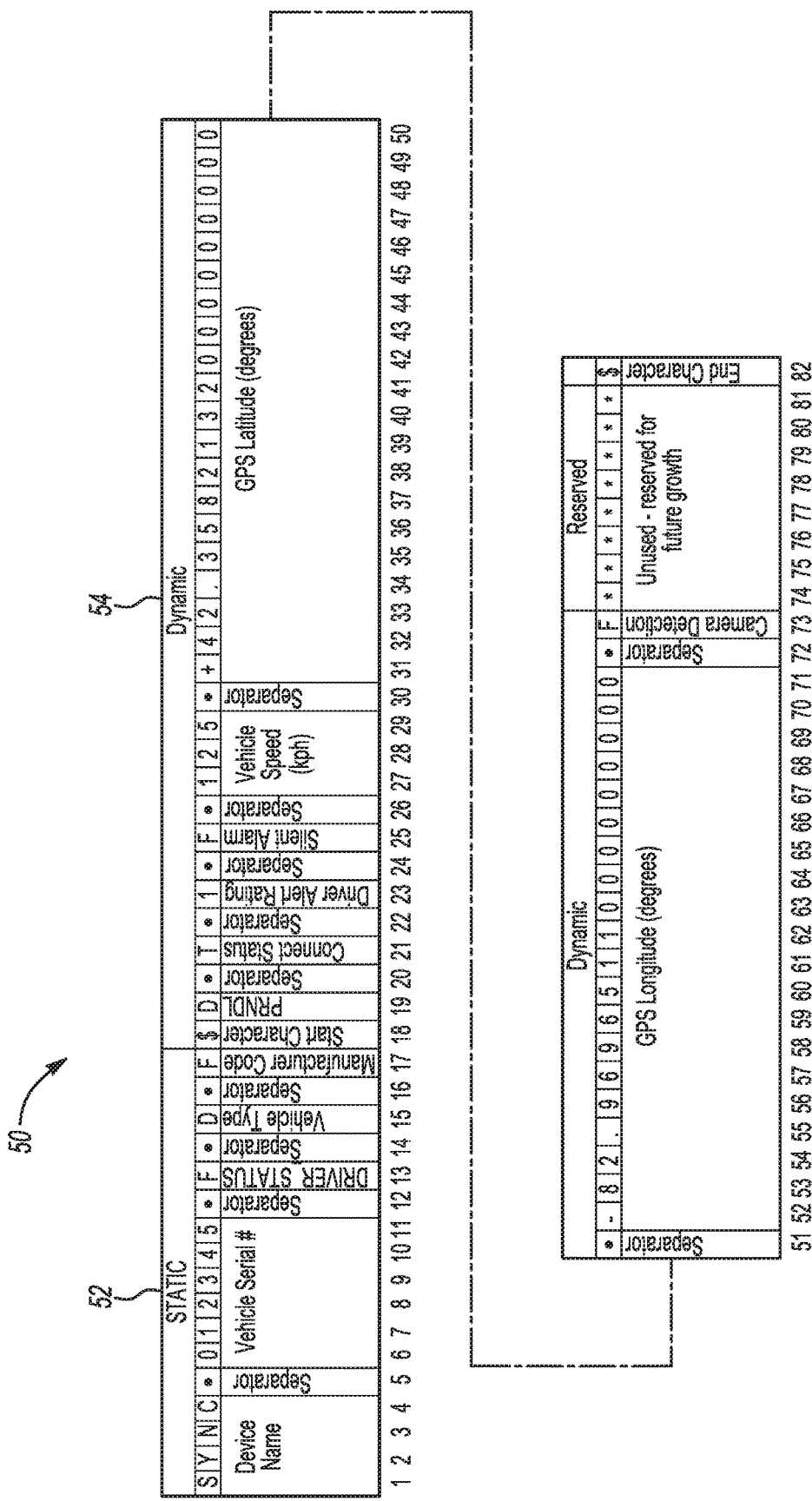
FIG. 2 depicts one example of information transmitted on a device name signal from the vehicle in accordance to one embodiment of the present invention.

FIG. 2 depicts one example of static and dynamic information transmitted from the vehicle on a device name signal 50 (or the signal DEVICE_NAME). The device name signal 50 comprises static information 52 and dynamic information 54. The static information 52 may provide data related to the device name (e.g., "SYNC"), a vehicle serial number, driver status, vehicle type, and a manufacturer code. In general, the data provided in the static information 52 remains constant and does not change per key cycle (or drive cycle). The dynamic information 54 may provide data related to transmission status, connect status, MyKey® (or driver status), driver alert rating, vehicle type, silent alarm, vehicle speed, latitude, longitude, vehicle speed, and camera status (or detection). Such information will change within a key cycle (or drive cycle) based on various criteria which will be explained below.

The device name as shown in FIG. 2 generally provides the identity of the vehicle transmitter that transmits data to the PCD 48. In this case, the device name is shown as "SYNC" (or APIM 46), which is the identity of the transmitter in the vehicle. The signal device name may now be expanded to include remaining static portions of information as well as dynamic information.

FIG. 3 depicts a table 60 including data related to the static information 52 and the dynamic information 54 of the device name signal 50 as shown in FIG. 2. It is recognized that the information provided in the table 60 is set forth as an example and provided for illustrative purposes.

The device name as shown in the static information 52 provides the identity of the transmitting device in the vehicle. For example, the transmitting device in the vehicle may be a SYNC module (or APIM 46).

The vehicle serial number as included within the static information 52 is fixed and is specific to the vehicle. The vehicle serial number may comprise the entire vehicle identification number (VIN) or comprise a portion of the VIN such as, for example, the last six digits. The PCD 48 may use this information to identify a particular vehicle and may establish trends over a period of time. For example, the PCD 48 may learn that it consistently sees a particular vehicle at approximately the same time during particular days of the weeks. This may allow the PCD 48 to filter out other vehicles that may be inadvertently within range while driving in traffic.

The driver status (or identity) as included within static information 52 is fixed and indicates if the driver is an administrative driver (e.g., parent, employer, or other master driver) or a secondary driver (e.g., teenager, employee, technician, valet, etc.). In the event the PCD 48 receives the signal DEVICE_NAME indicating that the driver is a secondary driver (and such a PCD 48 is paired to the vehicle as also indicated via connect status data in the signal DEVICE_NAME), the PCD 48 may restrict its operation and force hands free operation. In another example, all PCD(s) 48 in the vehicle may impose restrictions in the event the signal DEVICE_NAME indicates that the driver is a secondary driver, the restrictions may be imposed irrespective of whether a PCD 48 is paired to the vehicle under the circumstances.

The vehicle type as included within static information 52 is fixed and identifies the vehicle as either a personal vehicle or another type of vehicle such as a taxi, limousine, or mass transit. If any of the PCD(s) 48 receives the signal DEVICE_NAME indicating that the vehicle is something other than a personal vehicle, then the PCD(s) 48 may not implement restrictions. The data corresponding to vehicle type may prevent the PCD 48 from imposing restrictions when full PCD operations are deemed acceptable since the passenger is in a moving vehicle that is not being driven by such a party. For example, a passenger may be in a train, bus, or other mass transit vehicle where such vehicles are not operated by this class of passengers. It is not desirable to implement PCD restrictions for this class of passengers.

The manufacturer number as included within the static information 52 is fixed and identifies the manufacturer of the device. This allows various manufacturers to customize the protocol to meet their needs. The PCD 48 may use the manufacturer code to determine how to extract the data from the device name or to determine which protocol is being used to communicate therewith. For example, upon the PCD 48 receiving the device name and the manufacturer number in the device name signal 52, the PCD 48 may recognize that it is receiving data from a Ford vehicle and utilize the protocol as defined by Ford. It is recognized that the static information may also include data corresponding to a revision level for a particular original equipment manufacturer (OEM). For example, the revision level may correspond to a revision designation (e.g., rev B) and release date for a protocol as defined by a particular OEM.

The transmission status (or "PRNDL") is dynamic and represents the gear selection of the transmission. Once a PCD 48 correlates itself to a particular vehicle, it may alter functionality given it is in a vehicle that is being driven. For example, the PCD 48 may enter into a car mode as set forth in co-pending U.S. application Ser. No. 13/446,140 ("the '140 application") and filed on Apr. 13, 2012; which is hereby incorporated by reference.

The connect status is dynamic and indicates if a PCD 48 is actively paired with the APIM 46 (or under control of the APIM 46 to perform functions such as, but not limited to hands free operation while the vehicle is being driver). If a particular PCD 48 is paired to the vehicle, it can be assumed that such a PCD 48 belongs, or is in possession of the driver. If a PCD 48 belonging to driver is paired to the vehicle, other PCD(s) 48 located in the vehicle may assume that they are being operated by a passenger and therefore refrain from implementing PCD restrictions. On the other hand, if no PCD 48 is paired to the APIM 46, then other PCD(s) 48 in the vehicle may assume that they are being operated by a driver and implement some level of restrictions to prevent distracted driving.

The driver alert rating is dynamic and corresponds to the inferred alertness level of the driver per the lane departure system. In the event the PCD(s) 48 receive the signal DEVICE_NAME indicating that the vehicle is being operated by a driver with a low driver alert rating (e.g., drowsy), then the PCD(s) may trigger an alarm to alert the occupant(s) of the vehicle to revive the driver. In this case, the passengers in the vehicle are alerted that the driver may be exhibiting a drowsy (or impaired) condition. The alert system as part of the DAS in addition to passengers in the vehicle may alert the driver to take corrective action of the vehicle.

The silent alarm is dynamic and indicates if the driver of the vehicle has triggered an alarm (i.e., distress signal, car jack, etc.). As noted above, if the embedded cellular module 49 detects that the occupant has triggered the silent alarm, the embedded cellular module 49 transmits the signal SILENT_ALARM to the APIM 46. The APIM 46 may then indicate that the silent alarm is active on the signal DEVICE_NAME which is then transmitted to the PCDs 48a-48n within range of the transmitter of the APIM 46. The PCD 48, if positioned in the vehicle, may then upload the silent alarm notification in the service provider network of the respective PCD 48 to provide notice that there is a distress situation at play. At that point, such data can be retrieved by emergency personnel. Also, it is contemplated that a PCD 48 may be traveling in a vehicle that is within range of the vehicle encountering the distressed state may also detect the presence of the silent alarm and may then upload the silent alarm notification, the GPS location, and the vehicle serial number for the vehicle experiencing the distressed state in the service provider network to notify authorities. The location and identity of the vehicle that transmitted the signal DEVICE_NAME with the silent alarm being triggered may be determined via the GPS data and the vehicle serial number that is uploaded into the service provider network by the PCD 48.

The vehicle speed is dynamic and provides the speed of the vehicle. Vehicle speed has many potential uses by the PCD 48. In one example, the PCD 48 may use the vehicle speed in conjunction with other data (e.g. vehicle serial #, PRNDL, GPS) to determine if the PCD 48 is traveling within that particular vehicle. The PCD 48 may can compare its own speed (e.g., via the PCD's internal GPS) to the vehicles speed to determine they are correlated with one another. Once the PCD 48 determines that it is traveling within a particular vehicle, the vehicle speed may be used to trigger various driving modes (i.e., car HMI mode as noted in connection with '140 application). The PCD 48 may also use the vehicle speed to monitor and report driving behavior to an administrative driver in the event the driver status indicates that the driver is the secondary driver.

The vehicle speed information in the signal DEVICE_NAME refers to the actual vehicle speed. It may be desirable to capture "Vehicle Speed" as a binary value to simply indicate if the vehicle is in motion or stationary. For example, if the vehicle is in motion then vehicle speed may use one character in the signal DEVICE_NAME to indicate that the vehicle is in motion (e.g., "Vehicle Speed"=T). Likewise, if the vehicle is stationary (or below a specified value such as 5 mph), then "Vehicle Speed" may be set to "F". Using a binary value to indicate that the vehicle is moving may reduce the refresh rate of the transmission of the signal DEVICE_NAME and may also reduce the required number of characters for the signal DEVICE_NAME.

The latitudinal and longitudinal data in the signal DEVICE_NAME is dynamic and corresponds to the GPS latitude and GPS longitude of the vehicle. The PCD 48 may use the vehicle's GPS data in conjunction with other data (e.g. vehicle serial #, transmission status, and speed) to determine if the PCD 48 is traveling within that particular vehicle. One example of using GPS data to locate the position of a PCD is set forth in co-pending U.S. Publication No. 2011/0301780 to Miller et al.

The PCD 48 also has many other uses for the longitudinal and latitudinal information. For example, the PCD 48 may shut down its own integrated GPS chip. This aspect may improve battery life of the PCD 48. Several PCD based applications use GPS data such as Navigation, Family Locator, and GEO fencing. The user (e.g., vehicle owner/driver) may have the ability to enable/disable the GPS portion of the signal DEVICE_NAME for privacy concerns.

The camera detection data is dynamic and provides information indicative of whether the driver is using the PCD 48. By monitoring the driver position for phone usage via the camera 42 and in the event phone usage is detected, the signal DEVICE_NAME indicates that camera detection information is true. The PCD 48 can correlate a change in its own status to a change in "Camera Detection" status and infer that it is being used by the driver. One example of detecting PCD usage via camera detection is set forth in co-pending U.S. Publication No. 2011/0298924 to Miller et al. and filed on May 26, 2011.

Also shown in the signal DEVICE_NAME 50 of FIG. 2, a first special character (e.g., "$") is included therein which marks the start and end of data. A second special character (e.g. "*") is also used to separate each individual piece of data (e.g., transmission status, connect status, driver identity, etc.) It is contemplated that these characters may improve the fidelity of the communication between the APIM 46 and the PCD 48. Also shown in FIG. 2, unused characters of may be reserved for future use.

Figure 4:
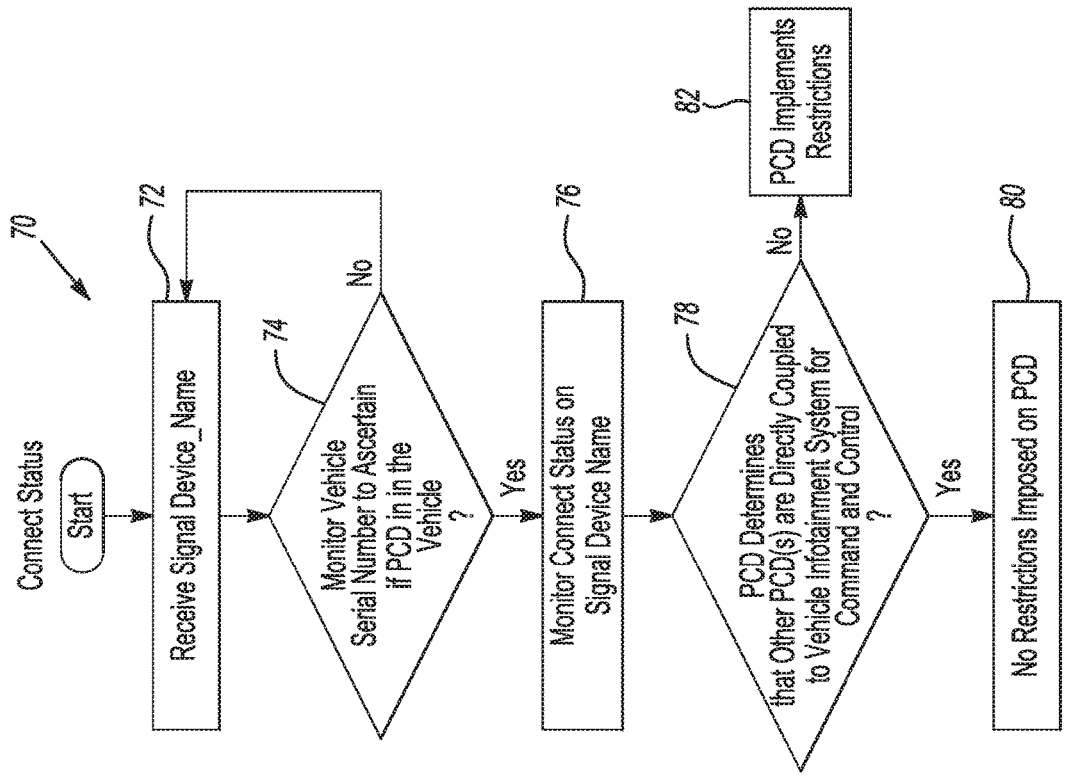
FIG. 4 depicts a method for restricting PCD usage based on connect status from the dynamic information.

FIG. 4 depicts a method 70 for restricting PCD usage based on connect status from the dynamic information 54 of the signal DEVICE_NAME.

In operation 72, the PCD 48 receives the signal DEVICE_NAME from the APIM 46.

In operation 74, the PCD 48 determines whether it is in the vehicle by monitoring for the vehicle serial number on the signal DEVICE_NAME. If the PCD 48 determines that it is in the vehicle, then the method 70 moves to operation 76. If not, then the method 70 back to operation 72.

In operation 76, the PCD 48 monitors the connect status on the signal DEVICE_NAME to determine if there is another PCD 48 that is paired to the vehicle (or to the APIM 46).

In operation 78, the PCD 48 determines whether there is another PCD 48 that is paired to the APIM 46. As noted, above the APIM 46 generally transmits the signal DEVICE_NAME as a beacon signal (or transmits the signal DEVICE_NAME) periodically to any PCD 48 within range thereof. Such communication is generally one way. However, a PCD 48 may be paired to the APIM 46 such that the APIM 46 can establish bi-directional communication with the paired PCD 48 to control the PCD 48 to perform features such as hands free operation, etc. It can be presumed that when a particular PCD 48 is paired to the vehicle and it is found in the vehicle, then such PCD 48 belongs to the driver of the vehicle and connect status of the signal DEVICE_NAME will indicate that the PCD 48 is in the vehicle and is connected to the APIM 46 for purposes of controlling various PCD operations (or bi-directional communication between the paired PCD 48 and the APIM 46 will indicate that the connect status is true).

If the PCD 48 determines that another PCD 48 is in the vehicle and it is also paired to the APIM 46 (e.g., connect status is true), then the method 70 moves to operation 80. If not, then the method 70 moves to operation 82.

In operation 80, the PCD 48 does not impose any restriction thereof as it can infer that it does not belong to a driver since the connect status indicates that another PCD 48 is in the vehicle and is paired to the vehicle.

In operation 82, the PCD 48 imposes various restrictions such as, hands free operation, or completely disables itself since it can infer that another PCD 48 is not in the vehicle and is not paired with the vehicle. In this case, it is possible that the PCD 48 may be used by a driver in the vehicle who has not paired such PCD 48 to the vehicle in an attempt to avoid PCD restrictions.

Figure 5:
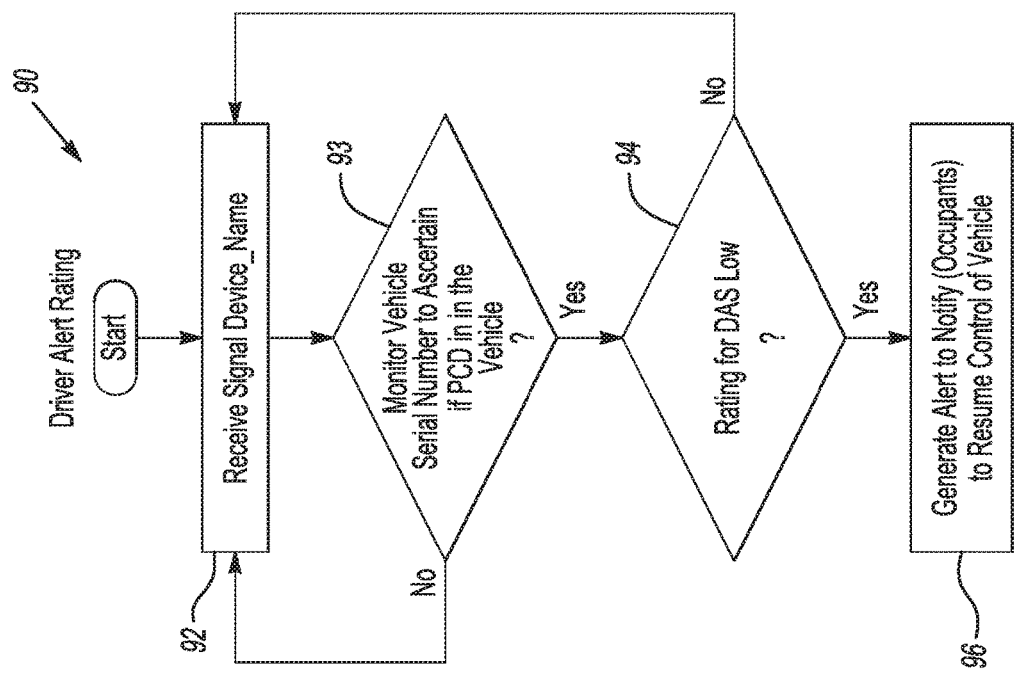
FIG. 5 depicts a method for generating an alert based on a driver alert rating from the dynamic information.

FIG. 5 depicts a method 90 for generating an alert based on a driver alert rating from the dynamic information 54 of the signal DEVICE_NAME.

In operation 92, the PCD 48 receives the signal DEVICE_NAME from the APIM 46.

In operation 93, the PCD 48 determines whether it is in the vehicle by monitoring for the vehicle serial number on the signal DEVICE_NAME. If the PCD 48 determines that it is in the vehicle, then the method 90 moves to operation 94. If not, then the method 90 back to operation 92.

In operation 94, the PCD 48 monitors the driver alert rating on the signal DEVICE_NAME to determine if the value indicated thereon is below the pre-defined threshold. If the driver alert rating is below the pre-defined threshold, then the method 90 moves to 96. If not, then the method 90 moves back to operation 92.

In operation 96, the PCD 48 generates an alarm to alert its holder to revive the driver of the vehicle. In this case, the PCD 48 belongs to a vehicle occupant and such PCD 48 receives a low driver alert rating for a driver of the vehicle. The PCD 48 generates the alert for the vehicle occupant to notify the driver of the low driver alert rating. This feature may be useful for an instance in which both the driver and other vehicle occupant(s) are in the vehicle and all exhibit some form of a drowsy or sleepy condition. In the event the alert is triggered for the driver via the DAS module 40 and the driver does not take corrective action, the PCD 48 belonging to the vehicle occupant(s) may notify the same so that the vehicle occupant(s) can alert the driver.

Figure 6:
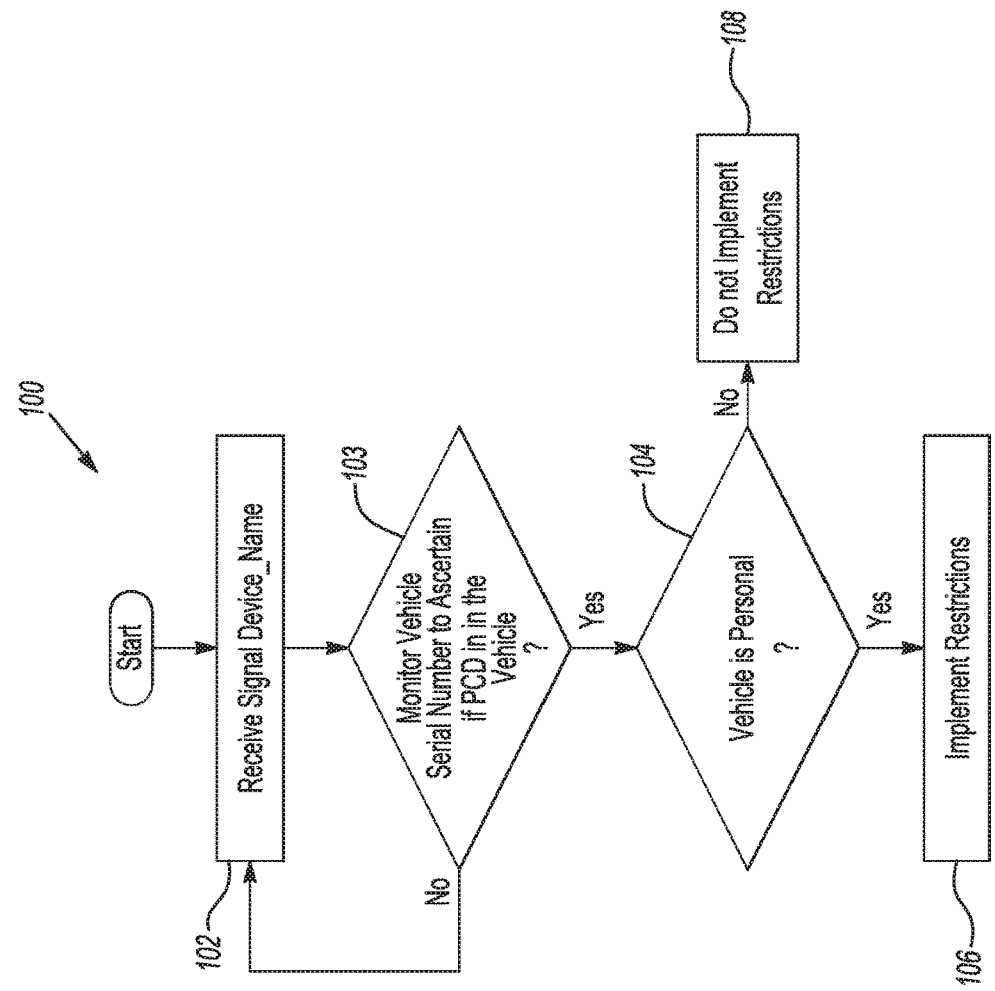
FIG. 6 depicts a method for restricting PCD usage based on vehicle type from the dynamic information.

FIG. 6 depicts a method 100 for restricting PCD usage based on vehicle type from the static information 52 of the signal DEVICE_NAME.

In operation 102, the PCD 48 receives the signal DEVICE_NAME from the APIM 46.

In operation 103, the PCD 48 determines whether it is in the vehicle by monitoring for the vehicle serial number on the signal DEVICE_NAME. If the PCD 48 determines that it is in the vehicle, then the method 100 moves to operation 104. If not, then the method 100 moves back to operation 102.

In operation 104, the PCD 48 monitors the vehicle type on the signal DEVICE_NAME to determine if the vehicle in which the PCD 48 is located in a personal vehicle or other mass transit vehicle such as, but not limited to mass (or public) transit vehicle such as a taxi, a limousine, or train, etc. If the PCD 48 determines that it is in a personal vehicle, then the method 100 moves to operation 106. If not, then the method 100 moves to operation 108.

In operation 106, the PCD 48 may elect to impose restrictions. In this case, the PCD 48 belonging to a driver may simply impose restrictions that may completely disable PCD usage or allow limited PCD usage (e.g., force on hands free operation or allow calls to be made to emergency personnel or to a selected number of authorized persons). In another case, all PCDs 48 (i.e., belonging to both a driver and at least one passenger) detected in the vehicle may simply elect to disable or allow limited functionality of the PCDs 48. This may depend on the particular implementation selected by the PCD carrier in terms of implementing PCD restrictions.

Figure 7:
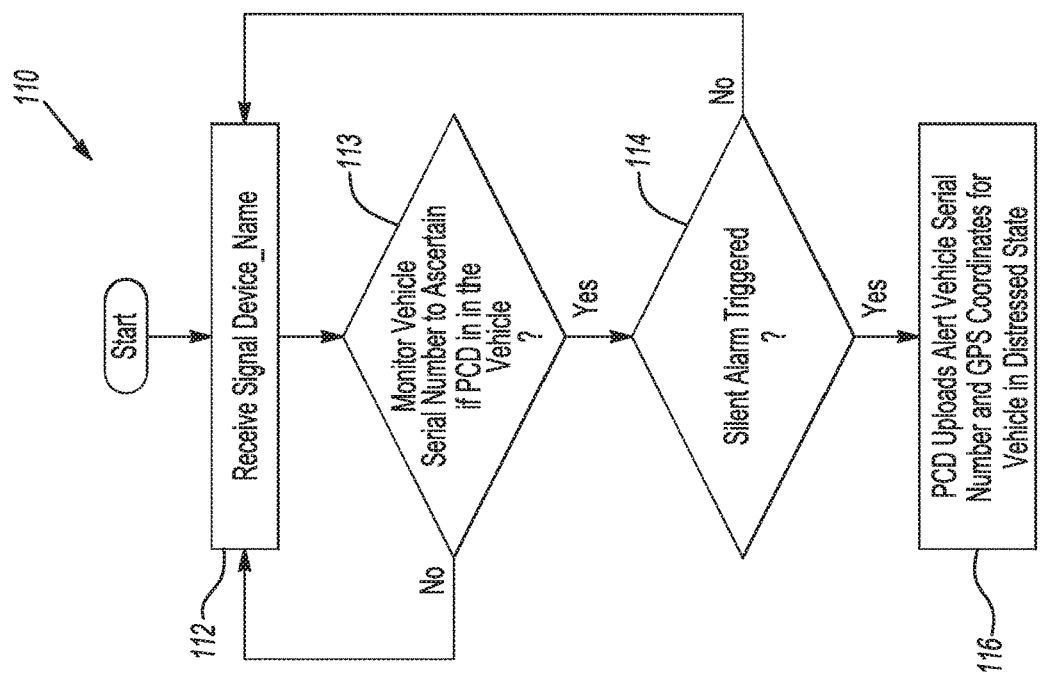
FIG. 7 depicts a method for executing a silent alarm operation based on silent alarm identifier from the dynamic information.

FIG. 7 depicts a method 110 for executing a silent alarm operation based on silent alarm identifier from the dynamic information 54 of the signal DEVICE_NAME.

In operation 112, the PCD 48 in range of the APIM 46 receives the signal DEVICE_NAME.

In operation 113, the PCD 48 determines whether it is in the vehicle by monitoring for the vehicle serial number on the signal DEVICE_NAME. If the PCD 48 determines that it is in the vehicle, then the method 110 moves to operation 114. If not, then the method 110 moves back to operation 112.

In operation 114, the PCD 48 monitors the silent alarm on the signal DEVICE_NAME to determine if a driver or passenger in a vehicle is experiencing a distress situation. For example, the PCD 48 may determine whether the vehicle it is in is experiencing a distress state or whether a neighboring vehicle is experiencing the distress state (as noted above, a PCD 48 positioned in a first vehicle may receive the signal DEVICE_NAME from an APIM 46 in a neighboring vehicle so long as it is in range of such APIM 46). If the PCD 48 determines that a silent alarm has been triggered, then the method 110 moves to operation 116. If not, then the method 110 moves to operation 112.

In operation 116, the PCD 48 uploads the alert, the GPS coordinates, and the vehicle serial number for the vehicle that experiences the distressed state in the PCD's 48 service provider network so as to alert the proper authorities of the alert condition, the identity of the vehicle experiencing the distressed state, and the location of such vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An apparatus for receiving information from a communication device in a vehicle, the apparatus comprising:
 a first personal communication device (PCD) configured to:
  receive static information including a first vehicle serial number for a first vehicle over a predetermined period of time; and
  learn to associate the first vehicle to the first PCD in response to receiving the first vehicle serial number over the predetermined period of time;
  receive a first signal including a second vehicle serial number from a second vehicle after associating the first vehicle to the first PCD;
  determine that the second vehicle is inadvertently within range of the first PCD after associating the first vehicle to the first PCD; and
  filter out the second vehicle serial number for the second vehicle after determining that the second vehicle is inadvertently within range of the first PCD.

2. The apparatus of claim 1 wherein the static information further includes a vehicle type corresponding to whether the first vehicle is one of a personal vehicle, a taxi, a limousine, and a train.

3. The apparatus of claim 2 wherein the first PCD is further configured to restrict an operation thereof in response to the vehicle type corresponding to the personal vehicle.

4. The apparatus of claim 2 wherein the first PCD is further configured to provide full operation thereof in response to the vehicle type corresponding to the one of the taxi, the limousine, and the train.

5. The apparatus of claim 1 wherein the first PCD is further configured to receive a driver alert rating from the first vehicle to indicate that a driver is experiencing an impaired condition and to generate an alarm to revive the driver.

6. The apparatus of claim 5 further comprising a second PCD configured to receive the driver alert rating from the first vehicle to indicate that the driver is experiencing the impaired condition and to generate an alarm to revive the driver, the second PCD being configured to be positioned along with a vehicle passenger.

7. The apparatus of claim 1 wherein the first PCD is further configured to receive a silent alarm indicative of a driver in the first vehicle being in a distressed state and a second PCD positioned in a second vehicle that is configured to receive information corresponding to the silent alarm from the first vehicle to indicate that the driver in the first vehicle is in a distressed state.

8. An apparatus comprising:
 a first personal communication device (PCD) configured to:
  receive a first vehicle serial number for a first vehicle over a predetermined period of time;
  learn to associate the first vehicle to the first PCD in response to receiving the first vehicle serial number over the predetermined period of time;
  receive a second vehicle serial number from a second vehicle after associating the first vehicle to the first PCD;
  determine that the second vehicle is inadvertently within range of the PCD after associating the first vehicle to the PCD; and
  filter out the second vehicle serial number for the second vehicle after determining that the second vehicle is inadvertently within range of the first PCD.

9. The apparatus of claim 8 wherein the first PCD receives a vehicle type corresponding to whether the first vehicle is one of a personal vehicle, a taxi, a limousine, and a train.

10. The apparatus of claim 9 wherein the first PCD is further configured to restrict an operation thereof in response to the vehicle type corresponding to the personal vehicle.

11. The apparatus of claim 10 wherein the first PCD is further configured to provide full operation thereof in response to the vehicle type corresponding to the one of the taxi, the limousine, and the train.

12. The apparatus of claim 8 wherein the first PCD is further configured to receive a driver alert rating from the first vehicle to indicate that a driver is experiencing an impaired condition and to generate an alarm to revive the driver.

13. The apparatus of claim 12 further comprising a second PCD configured to receive the driver alert rating from the first vehicle to indicate that the driver is experiencing the impaired condition and to generate an alarm to revive the driver, the second PCD being configured to be positioned along with a vehicle passenger.

14. The apparatus of claim 8 wherein the first PCD is further configured to receive a silent alarm indicative of a driver in the first vehicle being in a distressed state and a second PCD positioned in a second vehicle that is configured to receive the silent alarm from the first vehicle to indicate that the driver in the first vehicle is in a distressed state.

15. The apparatus of claim 1, wherein the first PCD is a cell phone.

16. The apparatus of claim 8, wherein the first PCD is a cell phone.

17. An apparatus comprising:
 a personal communication device (PCD) configured to:
  receive a first vehicle serial number for a first vehicle over a predetermined period of time;

learn to associate the first vehicle to the PCD in response to receiving the first vehicle serial number over the predetermined period of time;

receive a second vehicle serial number from a second vehicle after associating the first vehicle to the PCD;

determine that the second vehicle is inadvertently within range of the PCD after associating the first vehicle to the PCD; and recognize only the first vehicle serial number and ignore the second vehicle serial number for the second vehicle after determining that the second vehicle is inadvertently within range of the PCD.

18. The apparatus of claim 8, wherein the PCD is a cell phone.

19. The apparatus of claim 1, wherein the predetermined period of time corresponds to particular days over a week.

20. The apparatus of claim 1, wherein the predetermined period of time corresponds to particular days over a week.

* * * * *